United States Patent [19]

Loeffler

[11] Patent Number: 4,965,345
[45] Date of Patent: Oct. 23, 1990

[54] SOLVENT AZO DYES HAVING CARBOXYLIC ACID FUNCTIONS

[75] Inventor: Hermann Loeffler, Speyer, Fed. Rep. of Germany

[73] Assignee: Basf Aktiengesellschaft, Ludwigshafen, Fed. Rep. of Germany

[21] Appl. No.: 103,692

[22] Filed: Oct. 2, 1987

[30] Foreign Application Priority Data

Oct. 9, 1986 [DE] Fed. Rep. of Germany ....... 3634393

[51] Int. Cl.$^5$ ...................... C09B 29/01; C09B 29/40; C09B 31/053; C09B 31/068
[52] U.S. Cl. ..................... 534/651; 534/573; 534/756; 534/764; 534/771; 534/774; 534/789; 534/792; 534/829; 534/832
[58] Field of Search ............... 534/651, 764, 792, 756, 534/831, 832, 834, 836

[56] References Cited

U.S. PATENT DOCUMENTS

| | | | |
|---|---|---|---|
| 2,150,380 | 3/1939 | Knight | 534/651 X |
| 2,155,493 | 4/1939 | Knight et al. | 534/651 |
| 2,220,598 | 11/1940 | Fischer | 534/792 |
| 2,233,583 | 3/1941 | Cliffe et al. | 534/651 |
| 2,773,055 | 12/1956 | Hindermann et al. | 534/651 |
| 2,898,178 | 8/1959 | Kruckenberg | 534/792 X |
| 3,130,190 | 4/1964 | Merian et al. | 534/792 |
| 3,157,632 | 11/1964 | Ribka | 534/792 X |
| 3,845,032 | 10/1974 | Armento | 534/651 |
| 4,089,078 | 5/1978 | Botros | 534/792 X |
| 4,133,806 | 1/1979 | Gnad | 534/651 |
| 4,224,220 | 9/1980 | Lamm | 534/756 |
| 4,342,683 | 8/1982 | Reel et al. | 534/792 X |
| 4,772,292 | 9/1988 | Hahnke et al. | 534/756 X |

FOREIGN PATENT DOCUMENTS

| | | | |
|---|---|---|---|
| 748382 | 10/1970 | Belgium | 534/651 |
| 0765685 | 10/1971 | Belgium | 534/756 |
| 768748 | 11/1971 | Belgium | 534/651 |
| 2952759 | 7/1981 | Fed. Rep. of Germany | 534/651 |
| 848896 | 8/1939 | France | 534/834 |
| 1127885 | 8/1956 | France | 534/832 |
| 59-43064 | 3/1984 | Japan | 534/836 |
| 59-53553 | 3/1984 | Japan | 534/792 |
| 61-57648 | 3/1986 | Japan | 534/792 |
| 330485 | 7/1958 | Switzerland | 534/651 |
| 418495 | 2/1967 | Switzerland | 534/792 |
| 1282246 | 7/1972 | United Kingdom | 534/756 |
| 2167427 | 5/1986 | United Kingdom | 534/792 |

*Primary Examiner*—Floyd D. Higel
*Attorney, Agent, or Firm*—Oblon, Spivak, McClelland, Maier & Neustadt

[57] ABSTRACT

Solvent dyes of the formula

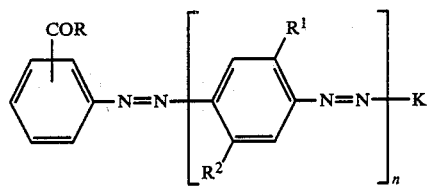

where

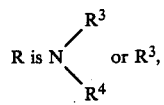

$R^1$ and $R^2$ are each, independently of the other, hydrogen, methyl, ethyl, methoxy or ethoxy, n is 0 or 1 and k, if n is 0, is the radical of a coupling component of the pyrazolone series or, if n is 1, is the radical of a coupling component of the pyrazolone, 2-naphthol, hydroxyquinoline, aniline, naphthylamine, pyridone or 2,6-diaminopyridine series, $R^3$ and $R^4$ each independently of the other being $C_1$–$C_{22}$-alkyl which may be substituted or interrupted by oxygen, imino or $C_1$–$C_4$-alkylimino, subject to the proviso that COR has more than 8 carbon atoms, are very highly suitable for coloring organic substrates.

7 Claims, No Drawings

SOLVENT AZO DYES HAVING CARBOXYLIC ACID FUNCTIONS

The present invention relates to a solvent dye of the formula I

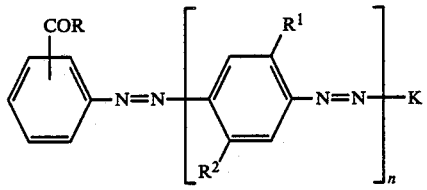
(I)

where

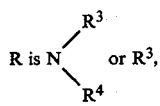

R¹ and R² are identical or different and each is, independently of the other, hydrogen, methyl, ethyl, methoxy or ethoxy,
n is 0 or 1 and
K, if n is 0, is the radical of a coupling component of the pyrazolone series or, if n is 1, is the radical of a coupling component of the pyrazolone, 2-naphthol, hydroxyquinoline, aniline, naphthylamine, pyridone or 2,6-diaminopyridine series,
$R^3$ and $R^4$ being identical or different and each, independently of the other, being $C_1$–$C_{22}$-alkyl which may be substituted by halogen, in particular chlorine, pyrrolidino, piperidino or morpholino or interrupted by oxygen, imino or $C_1$–$C_4$-alkylimino, subject to the proviso that COR has more than 8 carbon atoms.

All the alkyl radicals appearing in the abovementioned formula I can be straight-chain or branched.

Specific examples of $R^3$ and $R^4$ are:
$CH_3$, $C_2H_5$, $C_3H_7$-(n), $CH(CH_3)_2$, $C_4H_9$-(n), $CH_2$—$CH(CH_3)_2$, $CH(CH_3)C_2H_5$, $C_4H_8Cl$, $C(CH_3)_3$, $CH_2$—$CH(CH_3)OCH_3$, $C_5H_{11}$-(n), $CH(CH_3)CH(CH_3)_2$, $CH(C_2H_5)_2$, $CH(CH_3)C_3H_7$, $CH(CH_3)CH(C_2H_5)_2$, $C_2H_4CH(CH_3)_2$, $CH(CH_3)C_2H_4OCH_3$, $CH_2CH(C_2H_5)_2$, $C(C_2H_5)(CH_3)_2$, $C_2H_4OC_3H_7$, $C_6H_{13}$-(n), $C_2H_4OC_4H_9$, $C(CH_3)(C_2H_5)_2$, $C_2H_4CH(CH_3)_2$, $C_7H_{15}$, $CH(C_2H_5)C_4H_9$, $CH(C_3H_7)_2$,

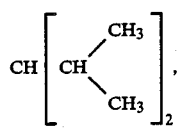

$CH(CH_3)C_2H_4CH(CH_3)_2$,
$CH(CH_3)CH_2OCH_2CH(CH_3)_2$, $C_8H_{17}$-(n),
$CH_2CH(C_2H_5)C_4H_9$, $CH(CH_3)C_3H_6CH(CH_3)_2$,
$CH_2CH(CH_3)CH_2OC(CH_3)_3$, $C_4H_8OC(CH_3)_3$,
$CH(CH_3)CH_2OC_5H_{11}$,
$CH(C_2H_5)CH_2OCH(CH_3)C_2H_5$,
$CH(C_2H_5)CH_2OCH_2CH(CH_3)_2$,
$CH(C_2H_5)CH_2OC(CH_3)_3$, $CH(C_3H_7)CH_2OC_3H_7$,
$C(CH_3)(C_2H_5)(C_4H_9)$, $C_9H_{19}$-(n), $C_9H_{19}$-(i),
$CH_2CH(CH_3)C_6H_{13}$, $C_{10}H_{21}$-(n), $C_{10}H_{21}$-(i),
$C_2H_4OCH_2CH(C_2H_5)C_4H_9$,
$CH(C_4H_9)CH_2OCH(CH_3)_2$, $CH_2CH(C_3H_7)C_5H_{11}$,
$CH(CH_3)CH_2OCH_2CH(C_2H_5)C_4H_9$,
$CH_2CH(CH_3)OCH_2CH(C_2H_5)C_4H_9$,
$C_3H_6OCH_2CH(C_2H_5)C_4H_9$, $C_{13}H_{27}$-(i)

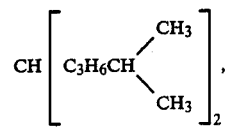

$C_{14}H_{29}$, $C_{15}H_{31}$, $C_{16}H_{33}$, $C_{17}H_{35}$, $C_{18}H_{37}$, $C_{19}H_{39}$, $C_{20}H_{41}$, $C_{21}H_{43}$, $C_{22}H_{45}$, $C_2H_4N(CH_3)_2$, $C_2H_4N(C_2H_5)_2$, $C_3H_6N(CH_3)_2$, $C_3H_6N(C_2H_5)_2$, $C_2H_4N(C_4H_9)_2$,

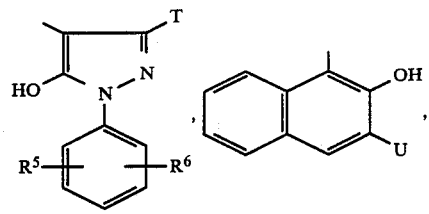

The coupling component radical K has the formula

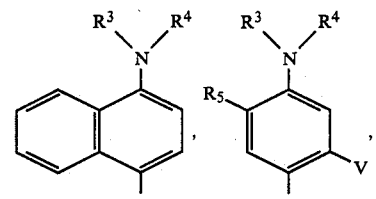

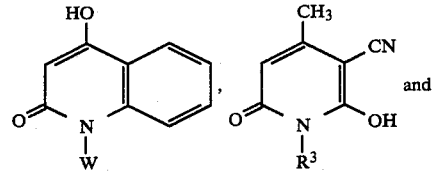

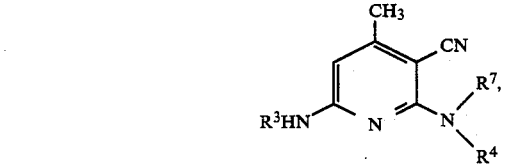

where
T is methyl, $CONHR^3$ or $COOR^4$,
U is hydrogen or COR,
V is hydrogen, methyl, methoxy, NHCOW or NHCOOW,
W is $C_1$–$C_4$-alkyl,
$R^5$ and $R^6$ are identical or different and each is, independently of the other, hydrogen, methyl, methoxy, chlorine or bromine,
$R^7$ is hydrogen or $R^3$ and
$R^3$ and $R^4$ each have the abovementioned meanings.

The novel solvent dyes of the formula I are, depending on the substituents, liquid, crystalline or even resinous, and are highly soluble in organic hydroxyl-containing solvents, such as alcohols, glycols or glycol ethers, and also in esters, ketones, aliphatics, long-chain aliphatic carboxylic acids and aromatics.

For that reason, the dyes according to the invention are advantageously suitable for coloring polymeric materials, such as cellulose acetate or triacetate. For the purposes of the present invention, polymeric materials are in particular materials which, in the form of film-forming, color-carrying polymers, are employed as surface finishes for paper, wood, glass, aluminum or plastic, or as assistants in the printing of surfaces, preferably in flexographic printing. They are for example nitro- or ethyl-cellulose, polyvinyl chloride, polyvinyl butyral, shellac, rosin modified with phenol-formaldehyde resins, polyamide resins, condensates of formaldehyde with urea and melamine or polyacrylic acid resins.

A further possible use, chiefly for the disazo dyes, is the coloring of ink ribbons in typewriters and printers. A precondition of suitability for this use is a very high solubility in sparingly volatile or nonvolatile and physiologically safe solvents such as phenylglycol or oleic acid.

The colorations have a very good water fastness, a good food fastness and a light fastness which is close to or even equal to that of heavy metal-containing complex acids.

Ink ribbons colored with dyes according to the invention and the print produced therewith are very fast to sublimation.

Those dyes which contain basic groups, in particular the disazo dyes, are also very highly suitable for the wet-end coloring of paper from an acetic acid solution and have a high substantivity.

Industrially particularly useful dyes or dye mixtures have the formula II

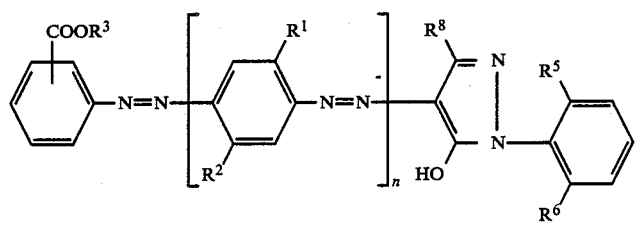

(II)

where $R^8$ is $CONHR^3$ or $COOR^4$ and $R^1$, $R^2$, $R^3$, $R^4$, $R^5$ $R^6$ and n each have the abovementioned meanings, subject to the proviso that one of $R^3$ or $R^4$ is branched.

Dye mixtures are obtained for example when the ester or amide groups in the starting components of the dyes of the formula II come from alcohol or amine mixtures of the type obtained in the hydroformylation of alkenes by hydrogenation or hydrogenating amination.

Particular importance is given to the dyes of the formula III

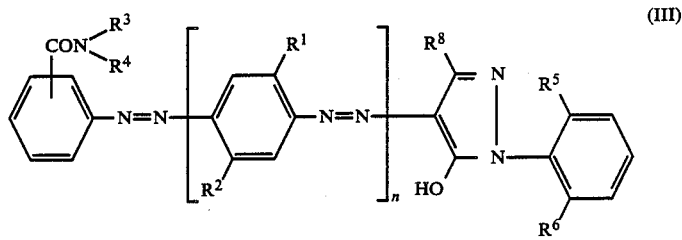

(III)

where $R^8$ is $CONHR^3$ or $COOR^4$ and $R^1$, $R^2$, $R^3$, $R^4$, $R^5$, $R^6$ and n each have the abovementioned meanings, subject to the proviso that either $R^3$ or $R^4$ is branched.

Very particular preference is given to those dyes of the formulae II and III where either $R^3$ or $R^4$ is interrupted by imino, in particular $C_1$–$C_4$-alkylimino.

Particular preference is given to solvent dyes of the formulae II or III where
$R^1$ is hydrogen, methyl or methoxy,
$R^2$ is methyl or methoxy,
$R^3$ and $R^4$ are each $C_1$–$C_{22}$-alkyl,
$R^5$ is hydrogen or methyl,
$R^6$ is chlorine and
$R^8$ is $COOCH_3$, $COOC_2H_5$, $CONHR^9$ or $CON(R^9)_2$, where
$R^9$ is $C_4$–$C_8$-alkyl which may be interrupted by $C_1$–$C_4$-alkylimino.

Since the dyes are frequently very reluctant to form crystals during their preparation, it is beneficial to employ crystal nucleating measures, such as strong cooling, trituration or the addition of seed crystals.

The examples which follow are intended to illustrate the invention in more detail. Percentages are by weight, unless otherwise stated.

EXAMPLE 1

24.8 g of N,N-di-(n)-butyl-4-aminobenzamide were dissolved with 30 ml of 30% strength hydrochloric acid in 200 ml of water at room temperature. The solution was cooled to 0°/5° C. with 200 g of ice. 30 ml of 3.33N aqueous sodium nitrite solution were added dropwise and stirred in at 0°/5° C. for 1 hour. Excess nitrous acid was then destroyed by adding a little sulfamic acid, and the solution obtained was gradually added to a solution of 26.7 g of methyl 1-(2-chloro-6-methylphenyl)-5-hydroxypyrazole-3-carboxylate in 200 ml of N,N-dimethylformamide containing 50 g of anhydrous sodium acetate.

The supernatant liquor over the dye resin precipitate was decanted off, the resin was dissolved in 300 ml of N,N-dimethylformamide, and the dye was isolated in crystalline form by precipitation in 2,000 ml of ice-water, filtering off with suction and drying at room temperature. The yellow dye of the formula

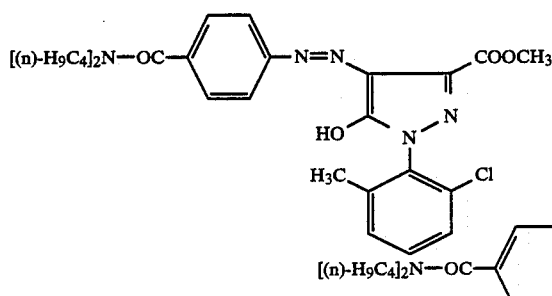

is highly suitable for coloring gasoline and heating oil and for producing inks both on an alcohol and a toluene base, and in coatings on paper, plastic, aluminum or wood it exhibits very good light fastness properties.

EXAMPLE 2

A diazonium salt solution of 24.8 g of N,N-di-(n)-butyl-4-aminobenzamide, obtained as described in Example 1, was combined with an aqueous hydrochloric acid solution of N-(3-diethylamino)propyl-1-(2-chlorophenyl)-5-hydroxypyrazole-3-carboxamide and buffered with sodium acetate to a pH of about 5 while cooling with ice. The dye was precipitated from the jellylike reaction mixture in resin form using ammonia, taken up in 150 ml of toluene and separated from the aqueous phase.

The toluene was distilled off to leave behind the dye in the form of a rapidly crystallizing resin of the formula

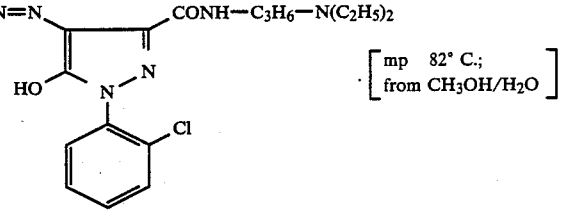

$$\begin{bmatrix} \text{mp } 82° \text{ C.;} \\ \text{from CH}_3\text{OH/H}_2\text{O} \end{bmatrix}$$

Its application properties are similar to those of the dye described in Example 1.

The coupling component of Example 2 was obtained by stirring 25.3 g of methyl 1-(2-chlorophenyl)-5-hydroxypyrazole-3-carboxylate with 26 g of 3-diethylaminopropylamine at 130° C. for 3 hours. To bring about the coupling, 20 ml of 30% strength hydrochloric acid and 100 ml of water were added to the reaction mixture.

The method of Examples 1 and 2 also produces the yellow dyes listed in Table 1, which have a similar range of properties:

TABLE 1

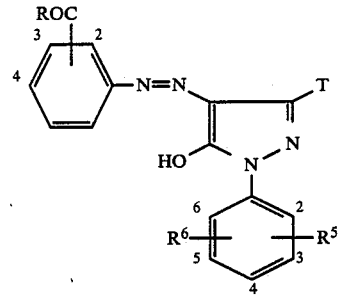

| Example No. | R | T | $R^5$ | $R^6$ |
|---|---|---|---|---|
| 3 | 4-N[CH$_2$—CH(C$_2$H$_5$)(C$_4$H$_9$)]$_2$ | CH$_3$ | H | H |
| 4 | 4-N[CH(CH$_3$)(C$_2$H$_5$)]$_2$ | COOCH$_3$ | H | H |
| 5 | 4-N[CH(CH$_3$)(C$_2$H$_5$)]$_2$ | COOC$_2$H$_5$ | H | H |
| 6 | 4-N(CH$_3$)[CH$_2$—CH(C$_2$H$_5$)(C$_4$H$_9$)] | COOCH$_3$ | H | H |

TABLE 1-continued

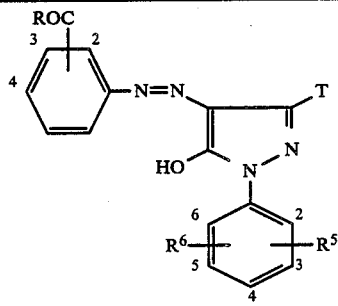

| Example No. | R | T | R⁵ | R⁶ |
|---|---|---|---|---|
| 7 | 4-N(C₄H₉)(CH₂—CH(C₂H₅)(C₄H₉)) | COOCH₃ | H | H |
| 8 | 4-N[CH₂—CH(C₂H₅)(C₄H₉)]₂ | COOCH₃ | H | H |
| 9 | 4-N[C₄H₉-(n)]₂ | COOCH₃ | 2-Cl | H |
| 10 | 4-N[CH(CH₃)(C₂H₅)]₂ | COOCH₃ | 2-Cl | H |
| 11 | 2-N[C₄H₉-(n)]₂ | COOCH₃ | 2-Cl | H |
| 12 | 4-N[CH₂—CH(C₂H₅)(C₄H₉)]₂ | COOCH₃ | 4-Cl | H |
| 13 | 4-N[C₄H₉-(n)]₂ | COOCH₃ | 2-Cl | 4-Cl |
| 14 | 4-N[CH(CH₃)(C₂H₅)]₂ | COOCH₃ | 2-Cl | 5-Cl |
| 15 | 4-N[C₄H₉-(n)]₂ | COOCH₃ | 2-Cl | 5-Cl |
| 16 | 4-N[CH₂—CH(C₂H₅)(C₄H₉)]₂ | COOCH₃ | 2-Cl | 5-Cl |
| 17 | 4-N(C₂H₅)₂ | COOCH₂—CH(C₂H₅)(C₄H₉) | 2-Cl | 6-CH₃ |
| 18 | 4-N(C₃H₇-(n))(CH(CH₃)(C₂H₅)) | COOCH₃ | 2-Cl | 5-Cl |
| 19 | 4-N(CH₃)(CH₂—CH(C₂H₅)(C₄H₉)) | COOCH₃ | 2-Cl | 6-CH₃ |
| 20 | 4-N(C₂H₅)₂ | CONHC₃H₆N(C₂H₅)₂ | 2-Cl | 6-CH₃ |
| 21 | 4-N(CH₃)₂ | CONHC₃H₆N(C₂H₅)₂ | 2-Cl | 6-CH₃ |
| 22 | 4-N[C₄H₉-(n)]₂ | CONHC₂H₄N(CH₃)₂ | 2-Cl | 6-CH₃ |

EXAMPLE 23

25.9 g of isononyl anthranilate were suspended in 75 ml of 30% strength hydrochloric acid. The suspension was diluted with 50 g of ice, and while external cooling was applied 30 ml of 3.33N aqueous sodium nitrite solution were added dropwise, and the diazonium salt dissolved. Excess nitrous acid was destroyed, and the diazonium salt was coupled onto methyl 1-(2-chloro-6-methylphenyl)-5-hydroxypyrazole-3-carboxylate as described in Example 1. The supernatant liquor was decanted off from the resinous dye precipitate, and the resin was stirred with 100 ml of methanol to effect crystallization. The precipitation was completed with 70% strength methanol, and the crystals were filtered off with suction, washed with 70% strength methanol and dried at 40° C. under reduced pressure. The yellow dye of the formula

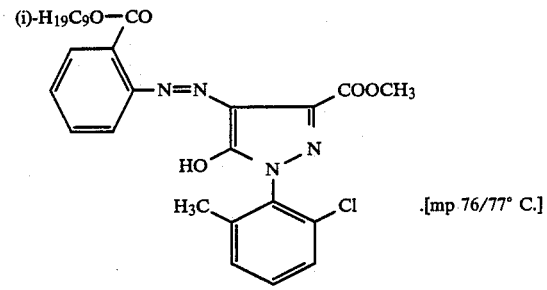

is highly suitable for use as a flexodye and for preparing yellow solvent-based wood stains. Applied, it has very good light fastness properties.

EXAMPLE 24

Example 23 was repeated to diazotize 20.7 g of neopentyl anthranilate and coupled onto N-(3-diethylamino)propyl-1-(2-chloro-6-methylphenyl)-5-hydroxypyrazole-3-carboxamide.

The dye, which had crystallized out in the form of its hydrochloride, was converted with ammonia water into the base, and was isolated by filtering off with suction and dried at 45° C. under reduced pressure (mp 83°/85° C. from $CH_3OH/H_2O$).

The yellow dye of the formula

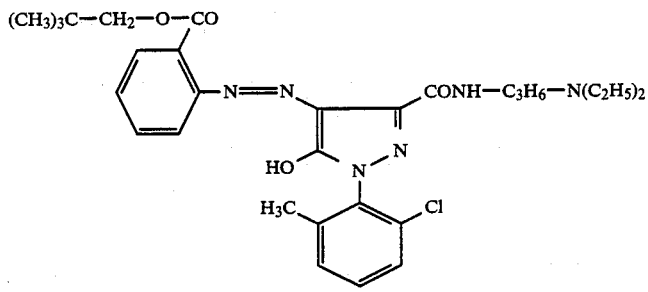

is very highly suitable for flexographic printing and has a good fastness level.

The yellow dyes of Table 2 are obtained in a similar manner and are similarly suitable for the range of uses mentioned, having similar properties.

TABLE 2

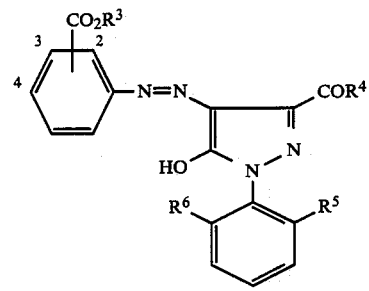

| Example No. | $R^3$ | $R^4$ | | $R^5$ | $R^6$ |
|---|---|---|---|---|---|
| 25 | 2-$CH_2$—CH$\langle{}^{C_2H_5}_{C_4H_9}$ | $OCH_3$ | | Cl | H |
| 26 | 2-$CH_2$—CH$\langle{}^{C_2H_5}_{C_4H_9}$ | $OCH_3$ | | Cl | $CH_3$ |

TABLE 2-continued

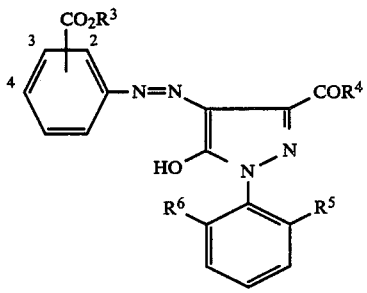

| Example No. | $R^3$ | $R^4$ | $R^5$ | $R^6$ |
|---|---|---|---|---|
| 27 | 2-$C_{10}H_{21}$-(i) | $OCH_3$ | Cl | $CH_3$ |
| 28 | 4-$C_{13}H_{27}$-(i) | $OCH_3$ | Cl | H |
| 29 | 2-$C_{13}H_{27}$-(i) | $OCH_3$ | H | H |
| 30 | 2-$C_{13}H_{27}$-(i) | $OCH_3$ | Cl | H |
| 31 | 2-$C_{13}H_{27}$-(i) | $OCH_3$ | Cl | $CH_3$ |
| 32 | 2-$CH_3$ | $OCH_2-CH(C_2H_5)(C_4H_9)$ | Cl | $CH_3$ |
| 33 | 2-$C_2H_4-O-C_2H_5$ | $NH-CH_2-CH(C_2H_5)(C_4H_9)$ | Cl | $CH_3$ |
| 34 | 4-$CH_2-CH(C_2H_5)(C_4H_9)$ | $NH-C_3H_6-N(C_2H_5)_2$ | Cl | H |
| 35 | 2-$CH_2-CH(C_2H_5)(C_4H_9)$ | $NH-C_3H_6-N(C_2H_5)_2$ | Cl | H |
| 36 | 2-$CH_2-CH(C_2H_5)(C_4H_9)$ | $NH-C_3H_6-N\begin{pmatrix}\text{pyrrolidinyl}\end{pmatrix}$ | Cl | $CH_3$ |
| 37 | 2-$CH_2-CH(C_2H_5)(C_4H_9)$ | $NH-C_2H_4-N(CH_3)_2$ | Cl | $CH_3$ |
| 38 | 2-$CH_2-CH(C_2H_5)(C_4H_9)$ | $NH-C_3H_6-N\begin{pmatrix}\text{morpholinyl}\end{pmatrix}O$ | Cl | $CH_3$ |
| 39 | 2-$CH_2-CH(C_2H_5)(C_4H_9)$ | $NH-C_3H_6-N\begin{pmatrix}\text{imidazolyl}\end{pmatrix}$ | Cl | $CH_3$ |
| 40 | 2-$CH_3$ | $NH-C_3H_6-N(C_2H_5)_2$ | Cl | $CH_3$ |
| 41 | 2-$CH_2-C(CH_3)_3$ | $NH-C_3H_6-N(C_2H_5)_2$ | Cl | H |

EXAMPLE 42

19.8 g of 2-methyl-5-methoxy-4'-N,N-dibutylcarbamoyl-4-aminoazobenzene were diazotized at 0°–5° C. in 150 ml of glacial acetic acid, 50 ml of water and 15 ml of 30% strength hydrochloric acid using 15 ml of 3.33N aqueous sodium nitrite solution. After excess nitrite had been destroyed, an ice-cold aqueous hydrochloric acid solution of N-(2-dimethylaminoethyl)-1-(2-chloro-6-methylphenyl)-5-hydroxypyrazole-3-carboxamide was added, and coupling was effected with sodium acetate at pH 3.

The resinous precipitate was dissolved in 1,500 ml of hot water, filtered with active carbon and precipitated at ~40° C. with ammonia water. The red dye of the formula

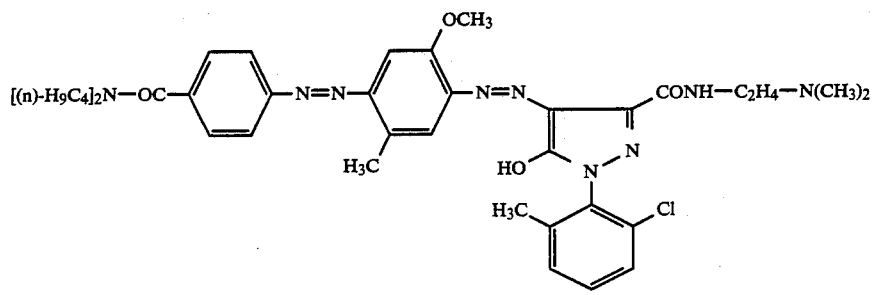

was filtered off with suction, washed with water and dried at 80° C.

The dye obtained is readily soluble in alcohols, esters, ketones and aromatics and is suitable for any use for which this property is a precondition, for example as a flexographic ink or for coloring inks and oils. In an aqueous acetic acid solution the dye is suitable for the wet-end coloring of paper, and in a solution of oleic acid or an oleic acid/phenylglycol mixture it is suitable in particular for coloring ink ribbons for printers.

EXAMPLE 43

36 g of N,N-di(2-ethylhexyl)-4-aminobenzamide were dissolved in 100 g of oleic acid. 50 ml of 30% strength hydrochloric acid were added at 10°/15° C., followed by 30 ml of 3.33N aqueous sodium nitrite solution. The mixture was stirred at 10°/15° C. for three hours. Excess nitrous acid was then destroyed with a little sulfamic acid, and the diazotization mixture was then added to a solution of 13.7 g of p-cresidine in 100 ml of water and 10 ml of 30% strength hydrochloric acid. After 50 g of phenylglycol and sodium acetate had been added to pH 1.5, the coupling was completed at 40° C. After a phase separation, 50 ml of 30% strength hydrochloric acid and at 0°/10° C. 30 ml of 3.33N aqueous sodium nitrite solution were metered into the organic phase, the addition being carried out gradually in the latter case. After stirring for one hour at 5°/10° C. the excess nitrous acid was removed, and 26.6 g of methyl 1-(2-chloro-6-methylphenyl)-5-hydroxypyrazole-3-carboxylate were added to the diazotization mixture. Sodium acetate was added to buffer to pH 3 to complete the coupling. After phase separation and stirring out the organic phase three times with water, the dye solution was dried at 50° C. under reduced pressure and standardized to a dye content of 30% with a 2:1 mixture of oleic acid/phenylglycol. The solution contained the dyes

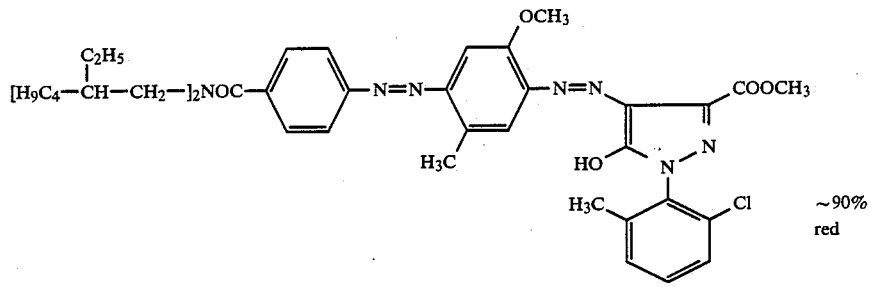

and

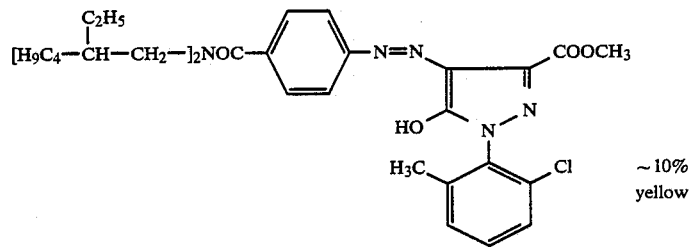

The solution is very highly suitable for coloring ink ribbons for typewriters red.

The dyes of Tables 3 and 4 below have a very similar range of properties and uses. Those which carry basic groups are also suitable for the wet-end coloring of paper.

TABLE 3

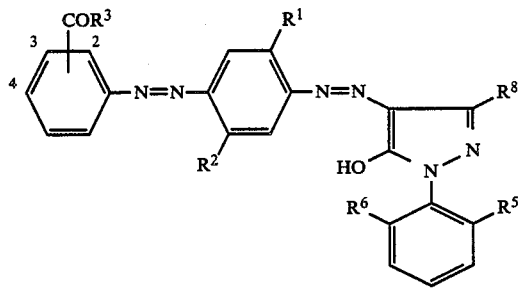

| Example No. | R³ | R¹ | R² | R⁸ | R⁵ | R⁶ | Hue |
|---|---|---|---|---|---|---|---|
| 44 | 4-N[C₄H₉-(n)]₂ | CH₃ | CH₃ | COOCH₃ | Cl | CH₃ | orange |
| 45 | 2-OC₁₀H₂₁-(i) | CH₃ | CH₃ | COOCH₃ | Cl | CH₃ | orange |
| 46 | 4-N[C₄H₉-(n)] | CH₃ | CH₃ | CH₃ | Cl | CH₃ | orange |
| 47 | 4-N[C₆H₁₃-(n)]₂ | CH₃ | CH₃ | COOCH₃ | Cl | CH₃ | orange |
| 48 | 4-N(CH₃)(CH₂—CH(C₂H₅)(C₄H₉)) | CH₃ | CH₃ | COOCH₃ | Cl | CH₃ | orange |
| 49 | 4-N(C₄H₉)(CH₂—CH(C₂H₅)(C₄H₉)) | OCH₃ | CH₃ | COOCH₃ | Cl | CH₃ | red |
| 50 | 4-N[CH₂—CH(C₂H₅)(C₄H₉)]₂ | CH₃ | CH₃ | COOCH₃ | Cl | H | orange |
| 51 | 4-N(C₄H₉)(CH₂—CH(C₂H₅)(C₄H₉)) | OCH₃ | CH₃ | COOCH₃ | Cl | CH₃ | red |
| 52 | 4-N[CH₂—CH(C₂H₅)(C₄H₉)]₂ | OCH₃ | OCH₃ | COOCH₃ | Cl | CH₃ | violet |
| 53 | 4-N[C₂H₅]₂ | CH₃ | CH₃ | CONH—C₃H₆—N(C₂H₅)₂ | Cl | CH₃ | orange |
| 54 | 4-N[C₄H₉-(n)]₂ | CH₃ | CH₃ | CONH—C₃H₆—N(C₂H₅)₂ | Cl | CH₃ | orange |
| 55 | 4-N[C₄H₉-(n)]₂ | OCH₃ | OCH₃ | CONH—C₂H₄—N(CH₃)₂ | Cl | CH₃ | violet |
| 56 | 4-N[C₄H₉-(n)]₂ | CH₃ | CH₃ | CONH—C₃H₆—N(morpholino) | Cl | CH₃ | orange |
| 57 | 4-N[C₄H₉-(n)]₂ | CH₃ | CH₃ | CONH—C₂H₄—N(CH₃)₂ | Cl | CH₃ | orange |
| 58 | 2-OCH₂—CH(C₂H₅)(C₄H₉) | CH₃ | CH₃ | CONH—C₃H₆—N(C₂H₅)₂ | Cl | CH₃ | orange |

TABLE 4

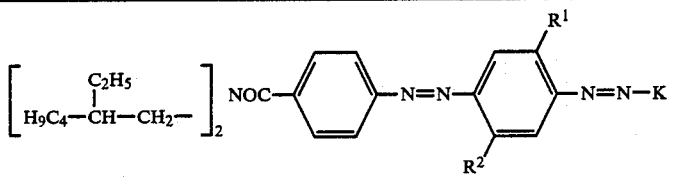

| Example No. | R¹ | R² | K | Hue |
|---|---|---|---|---|
| 59 | CH₃ | CH₃ | (2-hydroxynaphthalene) | violet |
| 60 | CH₃ | CH₃ | (3-hydroxy-1,2,3,4-tetrahydronaphthalene-2-carboxylic acid methyl ester) | violet |
| 61 | CH₃ | CH₃ | 4-methyl-3-cyano-2,6-bis(RHN)pyridine, R = C₃H₆OC₄H₉ | red |
| 62 | CH₃ | CH₃ | 4-methyl-3-cyano-2,6-bis(RHN)pyridine, R = C₃H₆N(C₂H₅)₂ | red |
| 63 | OCH₃ | CH₃ | 4-methyl-3-cyano-2,6-bis(RHN)pyridine, R = C₃H₆OC₄H₈OC₂H₅ | red |
| 64 | CH₃ | CH₃ | 3-N(C₂H₅)₂-N-propionylaminobenzene | red |
| 65 | OCH₃ | CH₃ | 3-N(C₂H₅)₂-5-methylbenzene | red |
| 66 | CH₃ | CH₃ | 4-methyl-3-cyano-6-hydroxy-2-oxo-N-R-pyridine, R = C₄H₉ | orange |
| 67 | OCH₃ | CH₃ | 4-methyl-3-cyano-6-hydroxy-2-oxo-N-R-pyridine, R = C₃H₆N(CH₃)₂ | red |

I claim:

1. A solvent dye of the formula:

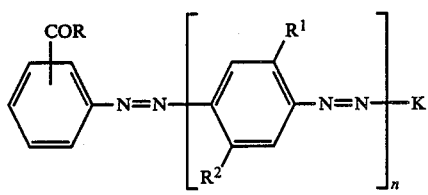

wherein
R is $NR^3R^4$ or $OR^3$;
$R^1$ and $R^2$ are identical or different and each is, independently of the other, hydrogen, methyl, ethyl, methoxy or ethoxy;
n is 1;
$R^3$ and $R^4$ are identical or different and each is, independently of the other, $C_1$–$C_{22}$-alkyl, $C_1$–$C_{22}$ alkyl substituted by halogen, pyrrolidino, piperidino or morpholino, or $C_1$–$C_{22}$-alkyl interrupted by oxygen, imino or $C_1$–$C_4$-alkylimino, subject to the proviso that COR has more than 8 carbon atoms; and
K is a radical of a coupling component of one of the formulae:

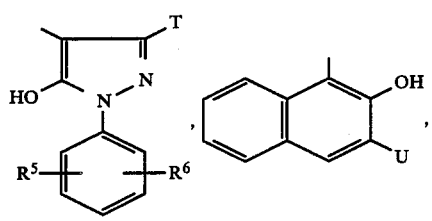

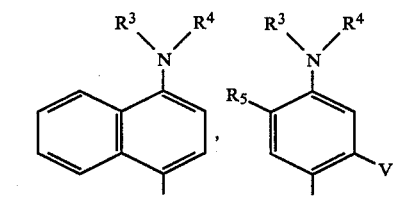

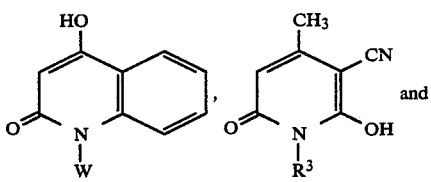

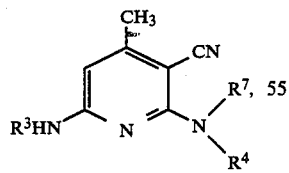

wherein:
T is $CONHR^3$ or $COOR^4$;
U is hydrogen or COR;
V is hydrogen, methyl, methoxy, NHCOW or NHCOOW,
W is $C_1$–$C_4$-alkyl;
$R^5$ and $R^6$ are identical or different and each is, independently of the other, hydrogen, methyl, methoxy, chlorine or bromine;
$R^7$ is hydrogen or $R^3$; and when K is

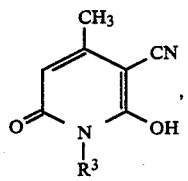

at least one of $R^3$ and $R^4$ is $C_{10}$–$C_{22}$-alkyl.

2. The solvent dye of claim 1, said dye having the formula:

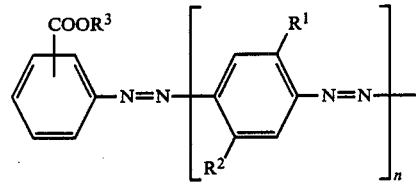

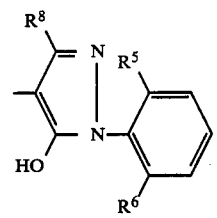

wherein
$R^5$ and $R^6$ are identical or different and each is, independently of the other, hydrogen, methyl, methoxy, chlorine or bromine; and
$R^8$ is $CONHR^3$ or $COOR^4$;
subject to the proviso that either $R^3$ or $R^4$ is branched.

3. The solvent dye of claim 1, said dye having the formula:

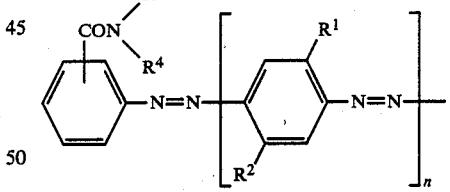

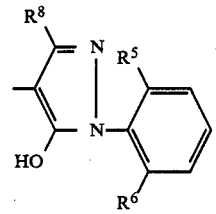

wherein:
$R^5$ and $R^6$ are identical or different and each is, independently of the other, hydrogen, methyl, methoxy, chlorine or bromine; and
$R^8$ is $CONHR^3$ or $COOR^4$;
subject to the proviso that either $R^3$ or $R^4$ is branched.

4. The solvent dye of claim 2, wherein either $R^3$ or $R^4$ is interrupted by imino.

5. The solvent dye of claim 2, wherein either $R^3$ or $R^4$ is interrupted by $C_1$–$C_4$-alkylimino.

6. The solvent dye of claim 3, wherein either $R^3$ or $R^4$ is interrupted by imino.

7. The solvent dye of claim 3, wherein $R^3$ or $R^4$ is interrupted by $C_1$–$C_4$-alkylimino.

* * * * *